(12) United States Patent
Newton et al.

(10) Patent No.: US 11,278,040 B2
(45) Date of Patent: Mar. 22, 2022

(54) HEAT EXCHANGER AND METHOD OF MAKING THEREOF

(71) Applicant: TAYLOR COMMERCIAL FOODSERVICE, LLC, Rockton, IL (US)

(72) Inventors: Robert K. Newton, Beloit, WI (US); Stephen W. Wadle, Beloit, WI (US)

(73) Assignee: TAYLOR COMMERCIAL FOODSERVICE, LLC, Rockton, IL (US)

( * ) Notice: Subject to any disclaimer, the term of this patent is extended or adjusted under 35 U.S.C. 154(b) by 1 day.

(21) Appl. No.: 17/024,786

(22) Filed: Sep. 18, 2020

(65) Prior Publication Data

US 2021/0000132 A1 Jan. 7, 2021

Related U.S. Application Data

(62) Division of application No. 15/926,462, filed on Mar. 20, 2018, now Pat. No. 10,785,992, which is a
(Continued)

(51) Int. Cl.
*F28D 7/10* (2006.01)
*A23G 9/22* (2006.01)
(Continued)

(52) U.S. Cl.
CPC ............... *A23G 9/22* (2013.01); *A23G 9/045* (2013.01); *A23G 9/28* (2013.01); *B23P 15/26* (2013.01);
(Continued)

(58) Field of Classification Search
CPC .. A23G 9/22; A23G 9/28; A23G 9/045; F28D 7/10; F28D 7/106; B23P 15/26; Y10T 29/49361; F28F 1/16
See application file for complete search history.

(56) References Cited

U.S. PATENT DOCUMENTS 552,724 A 1/1896 Scribner
813,918 A 2/1906 Schmitz
(Continued)

FOREIGN PATENT DOCUMENTS

CN 1073612 6/1993
CN 2348614 11/1999
(Continued)

OTHER PUBLICATIONS

Chinese First Office Action for application CN 201280054853, dated Aug. 31, 2015, 4 pages.
(Continued)

*Primary Examiner* — Ryan J. Walters
(74) *Attorney, Agent, or Firm* — Barnes & Thornburg LLP (57) ABSTRACT

A heat exchanger includes an inner tube extending longitudinally along a central axis and having an inner surface bounding a product chamber and an outer surface having a plurality of channels disposed at circumferentially spaced intervals in alternating relationship with a plurality of fins about the circumference of the outer surface of the inner tube; and a longitudinally extending outer tube disposed coaxially about and circumscribing the inner tube in radially spaced relationship, the outer tube having an inner surface contacting the plurality of fins of the inner cylinder, the outer surface being welded to the fins at a plurality of weld locations.

10 Claims, 4 Drawing Sheets

Related U.S. Application Data division of application No. 14/356,427, filed as application No. PCT/US2012/062358 on Oct. 29, 2012, now Pat. No. 9,943,088.

(60) Provisional application No. 61/556,987, filed on Nov. 8, 2011.

(51) Int. Cl.
  *A23G 9/04*  (2006.01)
  *A23G 9/28*  (2006.01)
  *B23P 15/26* (2006.01)
  *F28F 1/16*  (2006.01)

(52) U.S. Cl.
  CPC ............... *F28D 7/10* (2013.01); *F28D 7/106* (2013.01); *F28F 1/16* (2013.01); *Y10T 29/49361* (2015.01)

(56) References Cited

U.S. PATENT DOCUMENTS

| | | |
|---|---|---|
| 1,742,900 A | 1/1930 | Clemson |
| 2,610,478 A | 9/1949 | Lofstedt |
| 2,772,860 A | 12/1956 | Nelson |
| 3,016,463 A | 1/1962 | Needham |
| 3,199,583 A | 8/1965 | Hood, Jr. et al. |
| 3,443,631 A | 5/1969 | Bremer et al. |
| 4,088,182 A | 5/1978 | Basdekas et al. |
| 4,093,100 A | 6/1978 | Ford |
| 4,148,355 A | 4/1979 | Gehring |
| 4,290,275 A | 9/1981 | Disco et al. |
| 4,305,456 A | 12/1981 | Mueller |
| 4,528,733 A | 7/1985 | Lord |
| 4,552,724 A | 11/1985 | Matsumoto et al. |
| 4,635,707 A | 1/1987 | Gentry |
| 4,706,473 A | 11/1987 | Cipelletti |
| 4,767,593 A | 8/1988 | Wedellsborg |
| 5,027,971 A | 7/1991 | Perryman |
| 5,276,966 A | 1/1994 | Grant |
| 5,419,150 A | 5/1995 | Kaiser et al. |
| 5,435,155 A | 7/1995 | Paradis |
| 5,564,498 A | 10/1996 | Bochard |
| 5,575,066 A | 11/1996 | Cocchi |
| 5,709,095 A | 1/1998 | Johnson |
| 5,789,720 A | 8/1998 | LaGally |
| 5,871,045 A | 2/1999 | Hirth et al. |
| 5,975,335 A | 11/1999 | Witenhafer |
| 6,082,123 A | 7/2000 | Johnson |
| 6,253,573 B1 | 7/2001 | Schwitters et al. |
| 6,286,332 B1 | 9/2001 | Goldstein |
| 6,619,067 B2 | 9/2003 | Hiramatsu |
| 6,651,448 B2 | 11/2003 | Ross et al. |
| 6,688,137 B1 | 2/2004 | Gupte |
| 6,688,138 B2 | 2/2004 | Diflora |
| 7,191,824 B2 | 3/2007 | Wu et al. |
| 7,398,819 B2 | 7/2008 | Taras et al. |
| 7,472,744 B2 | 1/2009 | Gorbounov et al. |
| 7,552,642 B2 | 6/2009 | Neagle et al. |
| 7,691,337 B2 | 4/2010 | Bindelle |
| 7,870,891 B2 | 1/2011 | Rule |
| 8,474,515 B2 | 7/2013 | Burgers et al. |
| 2003/0159459 A1 | 8/2003 | Brunner |
| 2006/0288725 A1 | 12/2006 | Schlosser et al. |
| 2007/0151101 A1 | 7/2007 | Cocchi |
| 2010/0269534 A1 | 10/2010 | Kumakiri et al. |
| 2012/0104046 A1 | 5/2012 | Wadle et al. |
| 2014/0305618 A1 | 10/2014 | Newton et al. |

FOREIGN PATENT DOCUMENTS

| | | |
|---|---|---|
| CN | 1471832 | 2/2004 |
| CN | 101738109 | 6/2010 |
| CN | 101907417 | 12/2010 |
| EP | 0395080 | 10/1990 |
| EP | 1035387 | 9/2000 |
| EP | 2363675 | 9/2011 |
| WO | 03/085344 | 10/2003 |
| WO | 2010/151390 | 12/2010 |

OTHER PUBLICATIONS

Chinese Third OA and Search for application CN 201280054853.2, filed Sep. 29, 2016, 7 pages.
EP Search Report for Appl. No. EP10792494.6, dated Dec. 1, 2015, U350107EP, 5 pgs.
International Office Action and Search Report for Chinese Application No. 201810687359.9 dated Mar. 30, 2020, including English translation.
International Preliminary Report on Patentability dated Jan. 12, 2012.
International Search Report and Written Opinion dated Dec. 28, 2010.
Non Final Office Action for U.S. Appl. No. 13/263,166, dated May 11, 2017 in U350107US, 16pgs.
Office Action for Appl. No. EP12791342.4, dated Oct. 19, 2016, U370029EP, 4 pgs.
PCT International Preliminary Report on Patentability and Written Opinion of the International Searching Authority for International Application No. PCT/US2012/062358, dated May 22, 2014, 8 pages.
PCT International Search Report and Written Opinion of the International Searchi Authority, or the Declaration, for International Application No. PCT/US2012/062358, dated Apr. 10, 2013, 13 pages.
Supplemental European Search Report for application EP 10792494.6, dated Apr. 10, 2015, 5 pages.
Office Action issued in Appl. No. CN201810687359.9 (dated Aug. 17, 2021).

HEAT EXCHANGER AND METHOD OF MAKING THEREOF

CROSS-REFERENCE TO RELATED APPLICATIONS

This application is a divisional of U.S. patent application Ser. No. 15/926,462, filed Mar. 20, 2018, which is a divisional of U.S. patent application Ser. No. 14/356,427, filed May 6, 2014, which issued as U.S. Pat. No. 9,943,088, which is an U.S. National Stage application under 35 USC 371 of international application serial number PCT/US2012/062358, filed Oct. 29, 2012, which claims the benefit of U.S. provisional patent application Ser. No. 61/556,987 filed Nov. 8, 2011, the entire contents of which are each incorporated herein by reference.

FIELD OF INVENTION

This invention relates generally to heat exchangers for freezing and dispensing semi-frozen products and, more particularly, to an improved heat exchanger for removing heat from the product within the product freezing chamber of the dispensing apparatus.

DESCRIPTION OF RELATED ART

Soft-serve ice cream, yogurt, custard and other semi-frozen food products, as well as semi-frozen drinks, sometimes referred to as slushes, are commonly dispensed through a dispensing apparatus having a heat exchanger in the form of a freezing cylinder. The freezing cylinder, also referred to as a freezing barrel, defines a longitudinally elongated freezing chamber. Typically, unfrozen liquid product mix is added to the freezing chamber at the aft end of the freezing cylinder and selectively dispensed at the forward end of the freezing cylinder through a manually operated dispensing valve. A rotating beater, typically formed by two or more helical blades driven by a drive motor at a desired rotational speed, scrapes semi-frozen mixture from the inner wall of the freezing cylinder and moves the product forwardly through the freezing chamber defined within the freezing cylinder as the product transition from a liquid state to a semi-frozen state. The product within the freezing chamber changes from a liquid state to a semi-frozen state as heat is transferred from the product to a refrigerant flowing through an evaporator disposed about the freezing cylinder. The evaporator is operatively associated with and part of a conventional refrigeration system that also includes a compression device and a refrigerant condenser arranged in a conventional refrigerant cycle in a closed refrigerant circuit. Dispensing apparatus of this type may have a single freezing cylinder for dispensing a single flavor of product or a plurality of freezing cylinders, each housing a selected flavor of product, for dispensing each of the selected flavors and even a mix of flavors.

As noted previously, heat is removed from the product within the freezing cylinder and carried away by a refrigerant circulating through an evaporator disposed about the freezing cylinder. In dispensing apparatus having more than one freezing cylinder, an evaporator is disposed about each freezing cylinder. In conventional apparatus for dispensing semi-frozen products, the evaporator is typically configured either as a tube wound around and in contact with the outside wall of the freezing cylinder or as an annular chamber from between the outside wall of the freezing cylinder and the inside wall of an outer cylinder disposed coaxially about the freezing cylinder. Published international patent publication WO2010/151390 discloses a freezing cylinder having an evaporator including a plurality of channels disposed about the outer surface of an inner cylinder. While this design is well suited for its intended purposes, improvements in such freezing cylinders would be well received in the art.

BRIEF SUMMARY

According to an example embodiment of the present invention, a heat exchanger includes an inner tube extending longitudinally along a central axis and having an inner surface bounding a product chamber and an outer surface having a plurality of channels disposed at circumferentially spaced intervals in alternating relationship with a plurality of fins about the circumference of the outer surface of the inner tube; and a longitudinally extending outer tube disposed coaxially about and circumscribing the inner tube in radially spaced relationship, the outer tube having an inner surface contacting the plurality of fins of the inner cylinder, the outer surface being welded to the fins at a plurality of weld locations.

According to another example embodiment of the present invention, a method of making a heat exchanger includes obtaining an inner tube extending longitudinally along a central axis and having an inner surface bounding a product chamber and an outer surface having a plurality of channels disposed at circumferentially spaced intervals in alternating relationship with a plurality of fins about the circumference of the outer surface of the inner tube; positioning an outer tube over the inner tube, the outer tube being disposed coaxially about and circumscribing the inner tube in radially spaced relationship, the outer tube having an inner surface contacting the plurality of fins of the inner cylinder; and welding the outer tube to the inner tube at a plurality of weld locations.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
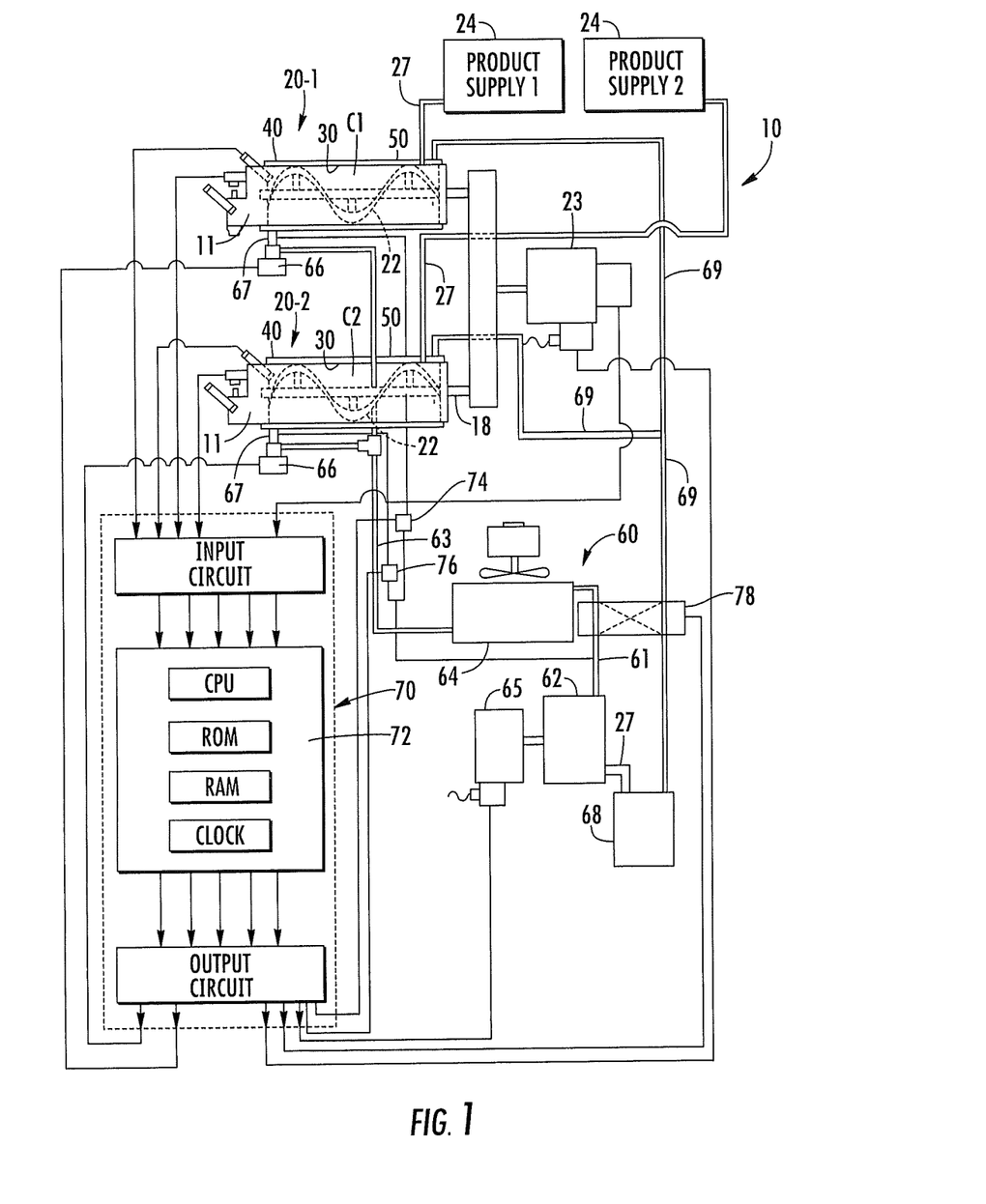
FIG. 1 is a schematic diagram illustrating an exemplary embodiment of an apparatus for freezing and dispensing a semi-frozen product embodying the invention.
Figure 2:
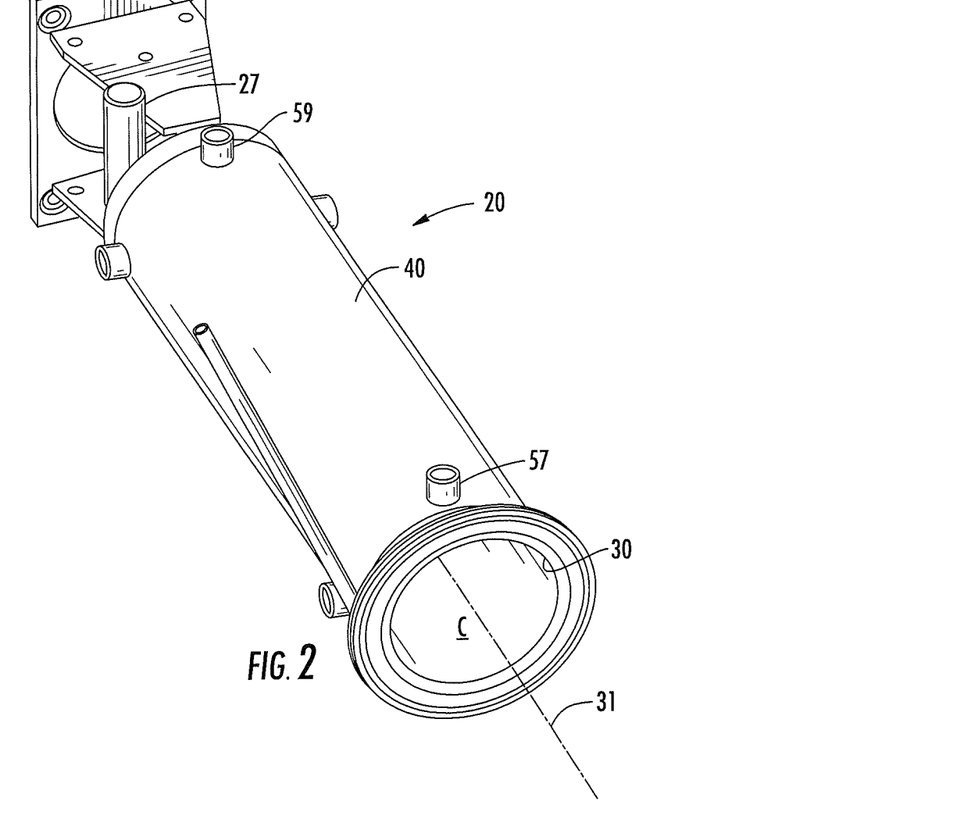
FIG. 2 is a perspective view of an exemplary embodiment of a freezing barrel in accordance with the invention.
Figure 3:
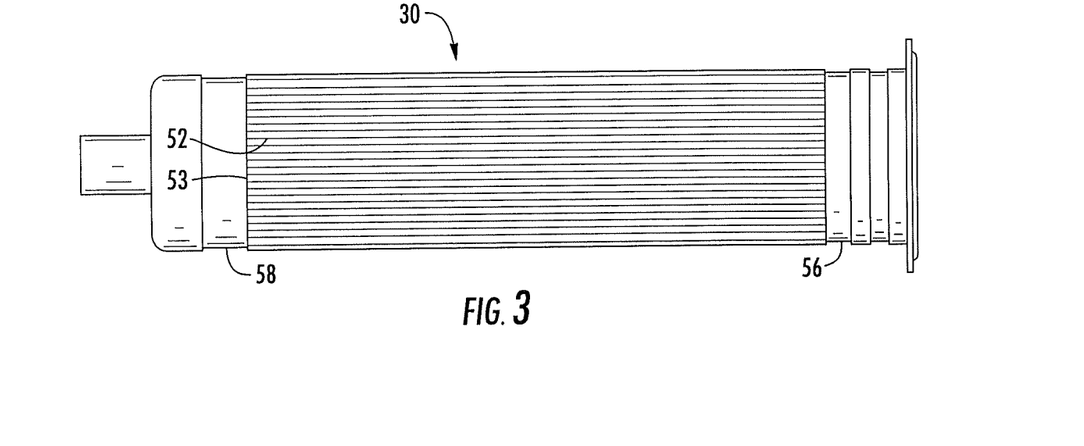
FIG. 3 is a perspective view of an exemplary embodiment of the inner cylinder of the freezing barrel of FIG. 2.
Figure 4:
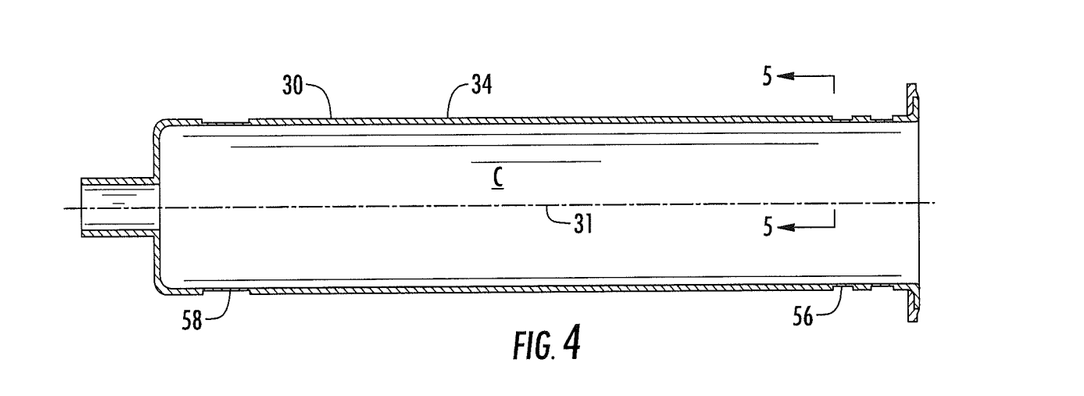
FIG. 4 is a sectioned side elevation view of the inner cylinder of FIG. 3.
Figure 5:
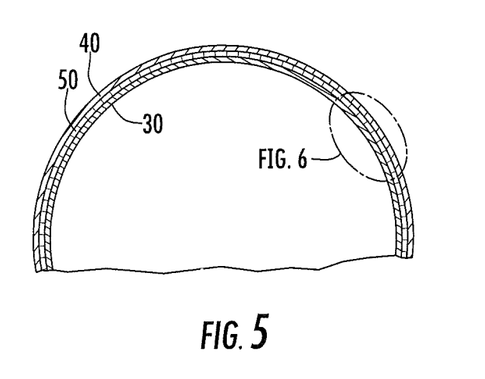
FIG. 5 is a cross-sectional elevation view of the inner cylinder of FIG. 3 taken along line 5-5 with the outer cylinder assembled circumferentially about the inner cylinder.
Figure 6:
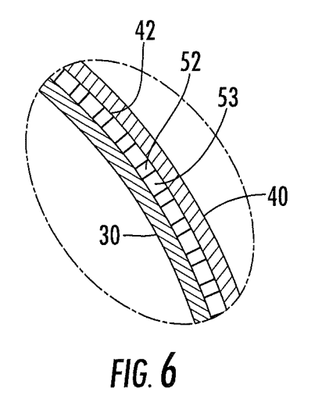
FIG. 6 is a magnified view of a segment of the freezing barrel defined within line 6-6 of FIG. 5.

Referring initially to FIG. 1, there is depicted schematically an exemplary embodiment of an apparatus 10 for freezing and dispensing semi-frozen food products, such as by way of example, but not limited to, soft-serve ice cream, ice milk, yogurt, custard, shakes, carbonated and/or non-carbonated ice slush drinks, that embodies the present invention.

In the depicted embodiment, the apparatus 10 includes two freezing chambers C1 and C2 for dispensing food products of different flavors or types. The freezing chambers C1 and C2 are defined within the axially elongated cylindrical barrels 20-1 and 20-2, respectively. Although shown as a dual barrel dispenser, it is to be understood that the apparatus 10 may have only a single barrel machine for dispensing a single product or may have three or more barrels for dispensing a plurality of flavors or types of products or a mix of flavors. Each of the barrels 20-1, 20-2 includes and inner cylinder 30, an outer cylindrical 40 circumscribing the inner cylinder 30 and an evaporator 50 formed between the inner cylinder 30 and the outer cylinder 40. Refrigerant is supplied from a refrigeration system 60 to the evaporators 50 of the respective barrels 20-1, 20-2 for refrigerating product resident within the respective freezing chambers C1 and C2.

A beater 22 is coaxially disposed and mounted for rotation within each of the chambers C1 and C2. Each beater 22 is driven by a drive motor 23 to rotate about the axis of its respective one of the barrels 20-1, 20-2. In the embodiment depicted in FIG. 1, a single drive motor, when energized, simultaneously drives each of the beaters 22 in rotation about the axis of its respective barrel. However, it is to be understood that each beater 22 may be driven by a motor dedicated solely to driving that respective beater. A respective product supply 24 is operatively associated with each of the barrels 20-1, 20-2 for supplying product to be frozen to the respective chamber C1 and C2 with which the product supply is associated. The apparatus 10 is also equipped with a dispensing valve system that is selectively operable for dispensing the semi-frozen product from the barrels in a manner well known in the art.

The refrigeration system 60 includes a single refrigerant vapor compressor 62 driven by a compressor motor 65 operatively associated with the compressor 62, and condenser 64 connected with the evaporators 50 in a refrigerant circuit according to refrigeration cycle. It is understood that multiple compressors may be used, with an individual compressor designated for each evaporator. The compressor 62 is connected in refrigerant flow communication by high pressure outlet line 61 connected to the refrigerant inlet to the condenser 64 and the refrigeration outlet of the condenser 64 is connected through a high pressure refrigerant supply line 63 to refrigerant flow control valves 66, one of which being operatively associated with one of the evaporators 50 of barrel 20-1 and the other being operatively associated with the other of the evaporators 50 of barrel 20-2. Each of the valves 66 is connected by a respective refrigerant line 67 to the refrigerant inlet of the respective evaporator 50 associated therewith. A respective refrigerant outlet of each evaporator 50 is connected through a low pressure refrigerant return line 69 and an accumulator 68 to the suction side of the compressor 62. The refrigerant flow control valves 66 may, for example, comprise on/off solenoid valves of the type which can be rapidly cycled between an open position passing flow of refrigerant to an associated evaporator 50 and a closed position blocking flow of refrigerant to an associated evaporator. The valves 66 may be implemented using a variety of devices including, but not limited to, pulse width modulated solenoid valves, electronic motor operated valves, automatic expansion valves, thermal expansion valves, ejectors, etc. Valves 74 and 76 connect the compressor outlet directly to evaporators 50 to enable hot gas heating of product in barrels 20-1 and 20-2. Four way valve 78 allows the system to run in a reverse gas mode, where the evaporators 50 serve as condensers, the heat product in barrels 20-1 and 20-2.

Different products have different thermal transfer rates and different freezing points. Therefore, operation of the refrigeration system 60 will vary dependent upon the products being supplied to the freezing chambers C1 and C2. Operation of the refrigeration system 60 may be controlled by a control system 70 that controls operation of the compressor drive motor 65, the beater motor 23, and the flow control valves 66. The control system 70 includes a programmable controller 72 that includes a central processing unit with associated memory, input and output circuits, and temperature sensors for sensing the temperature of the product within the chambers C1 and C2. For a more thorough discussion of the design and operation of an exemplary control system 70 reference is made to U.S. Pat. No. 5,205,129, the disclosure of which is hereby incorporated by reference in its entirety.

In the depicted embodiment, each barrel 20 is equipped with a selectively operable dispensing valve 11 disposed at the forward end of the barrel 20 for receiving product from the freezing chamber. However, as in some conventional dual barrel dispensers, the dispensing valve system may include a third dispensing valve selectively operable to dispense a mix of the two flavors or types of products present in the mixing chambers C1 and C2. The dispensing valve system may also comprise a single selectively operable valve that is selectively positionable in a first position to dispense product from chamber C1 only, in a second position to dispense product from chamber C2 only, and in a third position to dispense mix of the products from both chambers C1 and C2.

Briefly, in operation, product to be frozen is supplied to each of the chambers C1 and C2 from the respective product supply 24 associated therewith from a supply tube 27 opening into the chamber at the aft end of each barrel 20. The product supplies 24 are arranged, as in conventional practice, to feed as required a liquid comestible product mix and generally, but not always, an edible gas, such as for example, air, nitrogen, carbon dioxide or mixtures thereof, in proportions to provide a semi-frozen food product having the desired consistency. The liquid comestible product mix may be refrigerated by suitable apparatus (not shown) to pre-cool the product mix to a preselected temperature above the freezing temperature of the product mix prior to delivery to the chambers C1 and C2. The beaters 22 rotates within its respective chamber C1, C2 so as churn the product mix resident within the chamber and also move the product mix to the forward end of the chamber for delivery to the dispensing valve 11. The blades of the beaters 22 may also be designed to pass along the inner surface of the inner cylinder 30 as the beater rotates so as to scrape product from the inner surface of the inner cylinder 30. As the product mix churns within the chambers C1 and C2, the product mix is chilled to the freezing point temperature to produce a semi-frozen product ready-on-demand for dispensing. If gas is added to the product mix, the gas is thoroughly and uniformly dispersed throughout the product mix as the beaters rotate.

Referring now to FIGS. 2-6, in particular, each freezing barrel 20 includes an inner tube 30, an outer tube 40 circumscribing the inner tube 30 and an evaporator 50 formed between the inner tube 30 and the outer tube 40. The inner tube 30 comprises a cylinder extending longitudinally along a central axis 31 and having an inner surface bounding the freezing chamber C and an outer surface 34. The outer tube 40 comprises a cylinder extending longitudinally along the axis 31 and coaxially circumscribing the longitudinally extending inner cylinder 30. The outer tube 40 has an inner surface 42 facing the outer surface 34 of the inner cylinder 30. The inner tube 30 may be made from food grade stainless steel or other metal approved for use in connection in food processing applications. A product supply tube 27 opens into the freezing chamber C through a first end of the inner cylinder 30 of the barrel 20, which end is also referred to herein as the feed end or aft end. The dispensing valve 11 is disposed at the axially opposite end of the barrel 20, which end is also referred to herein as the discharge end or forward end.

The outer surface of the inner tube 30 is provided with a plurality of fins 52 and a plurality of channels 53 disposed at circumferentially spaced intervals in alternating relationship with a plurality of fins 52 about the circumference of the outer surface of the inner tube 30. The fins 52 and channels 53 may be formed integrally with the shell of the first tube 30, for example, by machining material from the outer surface of the inner cylinder 30 thereby simultaneously forming the channels 53 and the fins 52 that alternate with and extend radially outwardly between channels 53. The inner tube could also be formed with the fins 52 being made integral therewith by extrusion. In an embodiment, the inner tube 30 has an outer shell diameter that nearly matches the inside shell diameter of the outer tube 40, such that when the channels 53 are machined in the outer surface 34 of the inner tube 30 thereby forming the plurality of the fins 52 of the inner tube 30, the fins 52 extend radially outwardly to abut the inner surface 42 of the outer tube 40 when the barrel 20 is assembled by slip fitting the outer tube 40 over the inner tube 30.

The outer surface 34 of the inner tube 30 is also provided with a first recess 56 and a second recess 58 formed in and extending circumferentially about the outer surface 34 of the inner tube 30 at longitudinally spaced end regions of the inner tube 30. In the depicted exemplary embodiment the first recess 56 is at the product discharge end of the inner tube 30 and the second recess 58 is at the product feed end thereof. The first tube 30 has at least one inlet 57 opening to first recess 56 for receiving refrigerant from the refrigerant system 60 and has at least one outlet 59 opening to the second recess 58 for returning refrigerant to the refrigerant system 60. In the exemplary embodiment depicted in FIGS. 3-6, four refrigerant inlets 57 are provided at equally spaced circumferential intervals about the first recess 56 and four refrigerant outlets 59 are provided at equally spaced circumferential intervals about the second recess 58.

Each channel 53 forms a refrigerant flow passage that extends between and establishes fluid flow communication between the first recess 56 and the second recess 58. In the depicted embodiment, each channel 53 of the plurality of channels extends longitudinally parallel to the axis 31 of the inner tube 30 between the first recess 56 and the second recess 58. Thus, the first recess 56 forms a refrigerant inlet header and the second recess forms a refrigerant outlet header which together with the channels 53 formed in the inner tube 30, in assembly with the outer tube 40, provides a heat exchanger, which in the embodiment described herein defines the evaporator 50 of the freezing barrel 20 through which refrigerant is circulated in heat exchange relationship with the product resident within the freezing chamber C bounded by the inner surface of the inner tube 30 for chilling the product resident therein. The first recess 56 is connected in fluid flow communication via at least one inlet 57 with the refrigerant supply line 63 through valve 66 and line 67 to receive refrigerant into the evaporator 50, while the second recess 58 is connected in fluid flow communication via at least one outlet 59 with the refrigerant line 69 for passing refrigerant from the evaporator 50. In the depicted embodiment, four inlets 57 are provided to the first recess 56 at circumferentially spaced intervals of ninety degrees. Similarly, four outlets 59 are provided to the second recess 58 at circumferentially spaced intervals of ninety degrees.

In an embodiment, each channel 53 of the plurality of channels is machined into the outer surface of the inner tube 30 to define a flow passage having a desired cross-section shape, such as for example a generally rectangular or square cross-sectional shape. The channels 53 may be machined into the outer surface of the inner tube 30. Additionally, each channel 53 may be machined to a desired depth and a desired width to provide a flow passage having a desired hydraulic diameter. In an embodiment, each of the channels defines a flow passage having a cross-sectional flow area having a hydraulic diameter in the range of about 0.02 inch to 0.10 inch (about 0.50 millimeter to 2.54 millimeters). For example, in an embodiment, each of the channels 53 may be machined to have a depth of 0.0625 inch (1.5875 millimeters) and a width of 0.0625 inch (1.5875 millimeters) thereby defining a flow passage having a cross-sectional flow area having a hydraulic diameter of about 0.0625 inch (1.5875 millimeters). The plurality of channels 53 may be disposed at circumferentially equally spaced intervals about the circumference of the inner cylinder. For example, in an exemplary application of the semi-frozen product dispensing apparatus 10, an inner tube 30 of a freezing barrel 20 having an outer shell diameter of 4.1 inches (104 millimeters), a total of 128 equally circumferentially spaced channels 53 might be disposed about the circumference of the outer surface of the inner cylinder 30.

Figure 7:
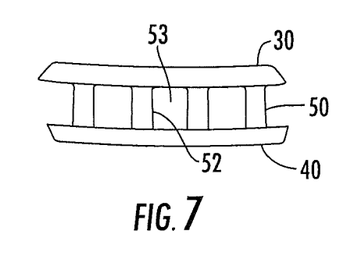
FIG. 7 is a magnified view of a segment of another embodiment of a freezing barrel in accordance with an aspect of the invention.

In an embodiment, as depicted in FIG. 7, the evaporator 50 is extruded as an integral member having a plurality of channels 53 disposed at spaced intervals about the evaporator 50. In the extrusion process, the channels 53 are formed between fins 52 that are formed integrally with and extend between a pair of spaced walls. The evaporator 50 may be formed in the flat and rolled into a cylindrical shape with the fins 52 extending radially or extruded in a cylindrical shape with the fins 52 extending radially. The cylindrically formed evaporator 50 is them assembled over the inner tube 30, as illustrated in FIG. 7, and brazed or soft-soldered in place over the outer surface of the inner tube 30. Since the structure of the extruded evaporator 50 provides for containment of the pressure of the refrigerant passing through the channels 53, no outer shell is required. Further, the inner tube 30 does not need to be designed to contain the high pressure of the refrigerant flowing through the evaporator 50 and may be made of a thinner thickness stainless steel than would be required in the case where the inner tube 30 forms a part of the refrigerant containment structure. In alternate embodiments, the evaporator 50 is made from an aluminum extrusion. The aluminum extrusion may be plated with copper and brazed to inner tube 30. Alternatively the extruded aluminum evaporator 50 may have its inside surface plated with nickel to provide a food grade surface.

The heat exchange efficiency of the evaporator 50 comprising a relatively large number of refrigerant flow channels, each having a relatively small hydraulic diameter, is significantly higher than that of prior art evaporators described herein before. Heat exchange is increased in part due to the increase in the effective heat transfer area between the refrigerant and the inner tube 30 due to the fins 52 flanking the channels 53 and in part due to the increased heat transfer effectiveness associated with the very small hydraulic diameter flow passages defined by the respective channels 53.

Figure 8:
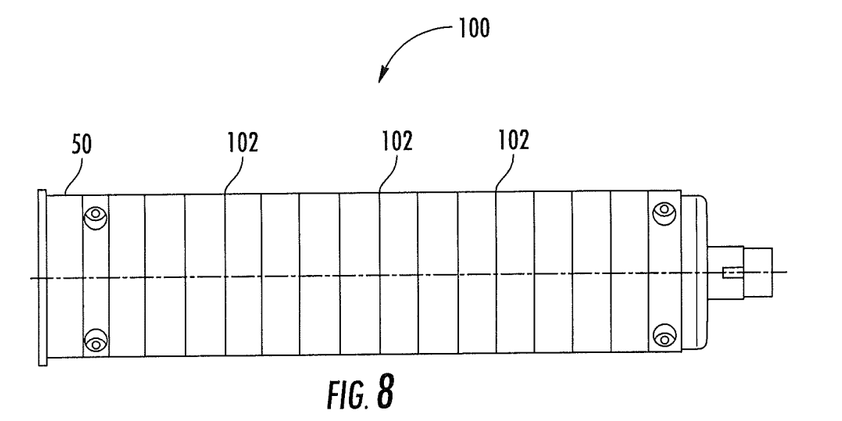
FIG. 8 depicts a welded heat exchanger in an exemplary embodiment.

FIG. 8 illustrates a heat exchanger 100 in an alternate embodiment. Heat exchanger 100 is similar to that shown in FIGS. 4-7, and includes an inner tube 30 having fins 52 defining channels 53 and an outer tube 40. In FIG. 8, the outer tube 40 is welded to the fins 52 of inner tube 30 at a plurality of circumferential weld locations 102. The weld locations 102 in FIG. 8 are spaced on the outer tube 40 along a longitudinal axis of the outer tube 40 and orthogonal to the longitudinal axis of the outer tube 40. Weld locations 102 may be equally spaced or non-equally spaced. Weld locations 102 join the inside surface of the outer tube 40 to a distal end of fins 52. Headers are welded to outer tube 40 to form a pressure tight assembly. Exemplary types of welding that may be used include resistance welding, electron beam welding, or laser beam welding.

Figure 9:
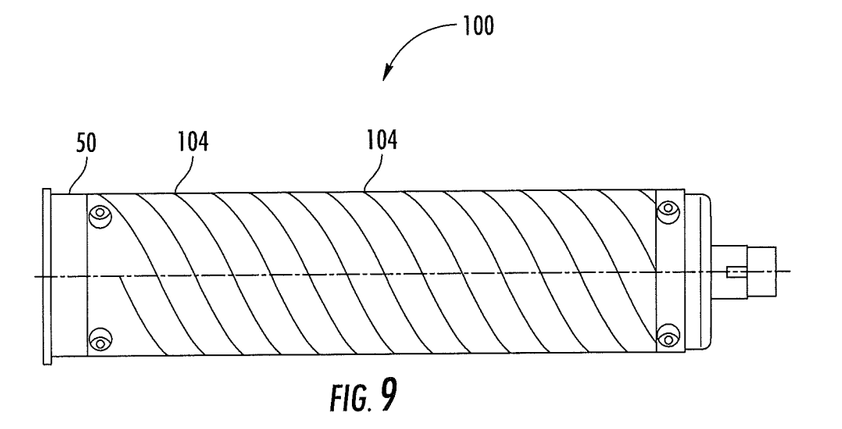
FIG. 9 depicts a welded heat exchanger in another exemplary embodiment.

FIG. 9 illustrates the heat exchanger 100 in an alternate embodiment. As shown in FIG. 9, weld locations 104 are located on a helix traversing the outer tube from a first end of the outer tube 50 to a second end of the outer tube 50. Multiple parallel helixes may be used. The embodiment of FIG. 9 provides an advantage that no weld locations overlap, reducing the potential for metal fatigue caused by overlapping weld locations.

The method of making the heat exchanger 100 includes forming the inner tube 30 with fins 52 using techniques described herein (e.g., extrusion, hobbing, machining) The outer tube 40 is then positioned over the inner tube 30. The outer tube 40 is then welded to the inner tube 30. The weld penetrates the outer tube 40 to fuse the outer tube 40 to a distal end of fins 52. No fusing of metal occurs at the channels 52.

By welding the inner tube 30 to the outer tube 40 along the length of the heat exchanger 100, the pressure carrying capability of the heat exchanger 100 is greatly increased. As a result, much higher pressures may be achieved, or thinner walls for the inner tube 30 and/or outer tube 40 may be used. From a pressure standpoint, the welded heat exchanger acts like a plurality (e.g., 128) tubes each with an inner diameter of 1/16". Existing designs act as an inner tube with a diameter of 3.85" and an outer tube with a diameter of 4.6". Hoop stress is a function of the diameter of the pressure vessel. As an example, if the outer diameter of a pressure carrying tube is decreased from 4.6" to 0.0625", the hoop stress is reduced approximately 30 times. This means that the shell may be able to hold 30 times more pressure. If needed, the strength of the headers may also be improved by adding weld points within the headers.

Pressure testing has been performed on a microchannel laser welded assembly and existing tube-in-tube assemblies. The laser welded assembly in embodiments of the invention held more than 1,000 psi, and up to 3,000 psi without failure. Existing assemblies with an inner tube and an outer tube are capable of holding in the range of 700 psi. The pressure carrying capability of both assemblies is dependent on design (diameter, length, and wall thickness) and material used.

By improving the pressure carrying capacity of the heat exchanger 100, a number of benefits are realized. Heat exchanger 100 may use less material than existing designs to support the same pressure requirements, resulting in a lower material cost. Furthermore, higher pressure refrigerants (e.g., carbon dioxide) may be used to improve efficiency. The welded heat exchanger 100 also allows the heat exchanger to sustain pressures experienced when the heat exchanger is used for heating in a reverse gas mode. There are situations where it is desirable to heat the food product in heat exchanger 100 to reduce bacteria. Existing systems use electrical resistance heating or hot gas heating to heat the food product (e.g., to 150 F). The welded heat exchanger 100 may be used as a condenser in reverse gas applications to heat the food product more efficiently.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

What is claimed is:

1. A heat exchanger comprising:
an inner tube extending longitudinally along a central axis and having an inner surface bounding a product chamber and an outer surface having a plurality of channels disposed at circumferentially spaced intervals in alternating relationship with a plurality of fins about the circumference of the outer surface of the inner tube; and
a longitudinally extending outer tube disposed coaxially about and circumscribing the inner tube in radially spaced relationship, the outer tube having an inner surface contacting the plurality of fins of the inner cylinder, the outer surface being welded to the fins at a plurality of weld locations;
the plurality of weld locations comprising at least two circumferential weld locations about an outer surface of the outer tube and orthogonal to the central axis, the circumferential weld locations spaced from each other along a longitudinal axis of the outer tube, wherein the at least two circumferential weld locations extend around the entire circumference of the outer tube.

2. The heat exchanger of claim 1, wherein the at least two circumferential weld locations comprise a first circumferential weld location proximate a first end of the outer tube and a second circumferential weld location proximate a second end of the outer tube.

3. The heat exchanger of claim 2, further comprising a third circumferential weld location between the first circumferential weld location and the second circumferential weld location.

4. The heat exchanger of claim 1, further comprising:
an inlet header defined by a first recess formed in and extending circumferentially about the outer surface of the inner tube at a first end of the inner tube; and
an outlet header defined by a second recess formed in and circumferentially extending about the outer surface of the inner tube at a second end of the inner tube;
wherein each channel of the plurality of channels defining a heat exchange fluid flow passage extending between the inlet header and the outlet header.

5. The heat exchanger of claim 1, wherein the inner tube and the outer tube are cylindrical.

6. The heat exchanger of claim 1, wherein each channel of the plurality of channels extends longitudinally in parallel relationship to the axis of the inner tube.

7. The heat exchanger of claim 1, wherein the plurality of channels are disposed at circumferentially equally spaced intervals about the circumference of the inner tube.

8. The heat exchanger of claim 1, wherein the plurality of channels are machined into the outer surface of the inner tube.

9. The heat exchanger of claim 1, wherein the weld locations are spaced circumferentially about the outer surface of the outer tube and orthogonal to the central axis.

10. The heat exchanger of claim 1, wherein the heat exchanger withstands a pressure of 1000 psi to 3000 psi.

\* \* \* \* \*